United States Patent [19]

McLennan

[11] Patent Number: 5,409,262
[45] Date of Patent: Apr. 25, 1995

[54] VEHICLE SAFETY SYSTEM

[76] Inventor: Ronald A. McLennan, 69500 Section St., Edwardsburg, Mich. 49112

[21] Appl. No.: 115,406

[22] Filed: Aug. 31, 1993

[51] Int. Cl.⁶ .............................................. B62D 7/22
[52] U.S. Cl. .................................... 280/784; 180/271; 296/189
[58] Field of Search ............ 180/271; 280/784, 730 R; 296/189

[56] References Cited

U.S. PATENT DOCUMENTS

| | | | |
|---|---|---|---|
| 3,162,479 | 12/1961 | Hewitt | 180/271 |
| 3,347,501 | 10/1967 | Van Eimeren | 280/232 |
| 3,383,077 | 5/1968 | Noviello, Jr. | 180/271 |
| 3,480,291 | 1/1969 | Hilfiker | 296/189 |
| 3,525,413 | 8/1970 | Kripke et al. | 180/232 |
| 3,638,748 | 2/1972 | Tixier | 180/232 |
| 3,698,670 | 10/1972 | Ewing | 280/730 R |
| 3,752,247 | 8/1973 | Schwenk | 180/271 |
| 3,774,712 | 11/1973 | Froumajou | 180/232 |
| 3,806,184 | 4/1974 | Dean | 280/189 |
| 3,831,998 | 8/1974 | Hewitt | 180/271 |
| 3,869,017 | 3/1975 | Feustel et al. | 180/232 |
| 3,879,073 | 4/1975 | Norlin | 180/271 |
| 4,232,755 | 11/1980 | Dow | 280/784 |
| 4,826,209 | 5/1989 | Farris | 280/784 |
| 5,048,888 | 9/1991 | Willy et al. | 296/189 |
| 5,076,389 | 12/1991 | Goor | 180/232 |

FOREIGN PATENT DOCUMENTS

| | | | |
|---|---|---|---|
| 0515488 | 11/1952 | Belgium | 296/189 |
| 2225481 | 1/1973 | Germany | 280/284 |
| 2222885 | 11/1973 | Germany | 280/284 |
| 1630315 | 7/1977 | Germany | 296/189 |

Primary Examiner—Margaret A. Focarino
Assistant Examiner—Christopher P. Ellis
Attorney, Agent, or Firm—Ken C. Decker

[57] ABSTRACT

A safety system is provided which allows a vehicle to collapse upon impact, thus absorbing energy. The vehicle includes a front frame and a rear frame, which are slidably engageable with one another. Upon impact, the front and rear frames translate, thus compressing the overall length of the vehicle. Energy reducing mechanisms connected to the front and rear frames, and the vehicle chassis, absorb the impact energy. A seat tilting mechanism is connected to the rear frame, which allows the passenger seat to tilt rearwardly upon impact. A bag below the bottom seat cushions is inflatable, and thus provides a barrier to impact. The vehicle drive shaft is collapsible and thus does not hinder the translation of the front and rear frames. A hood deflector is actuated upon impact, and deflects the hood upward, acting as an additional barrier against objects entering the passenger compartment.

11 Claims, 9 Drawing Sheets

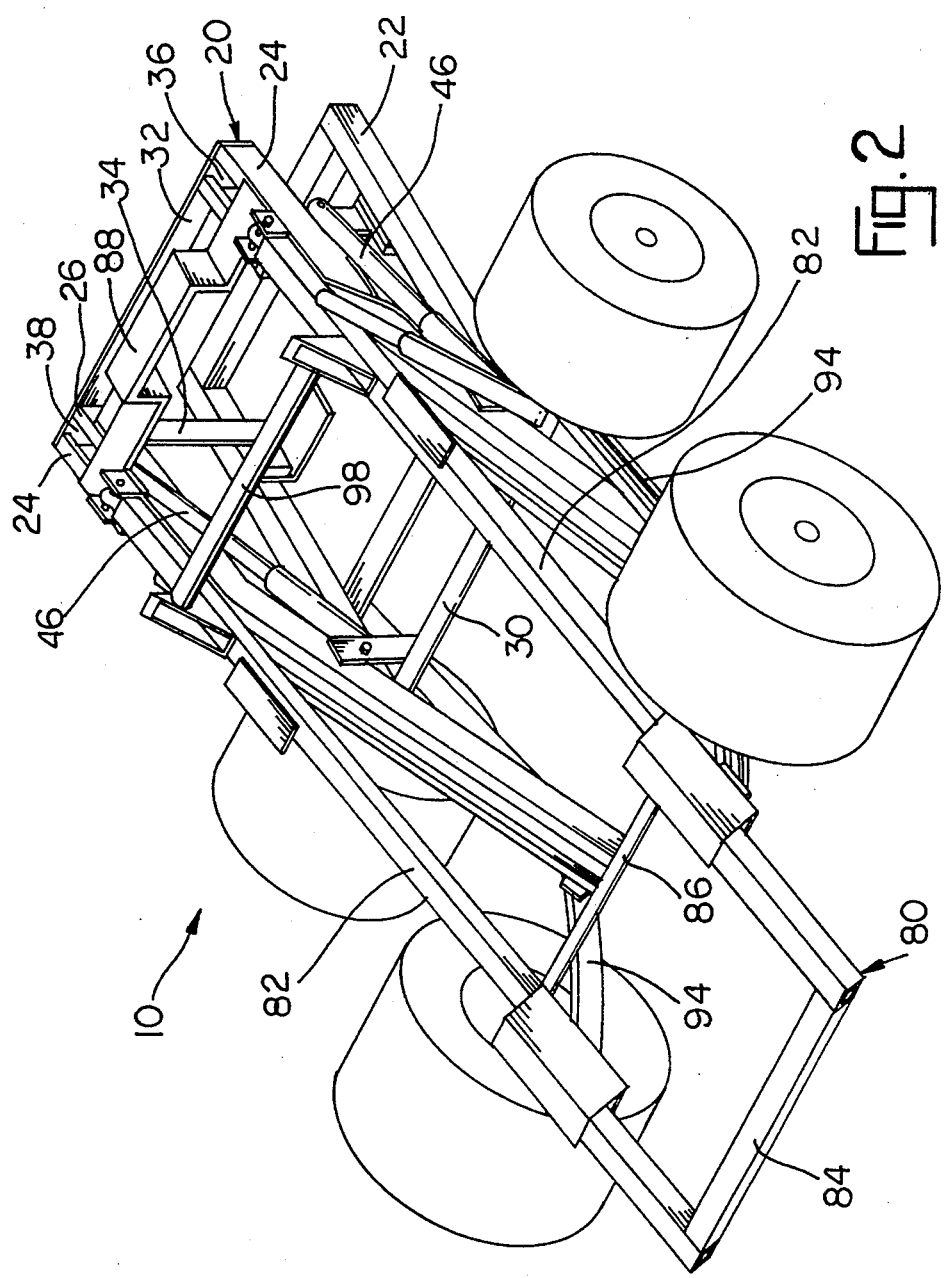

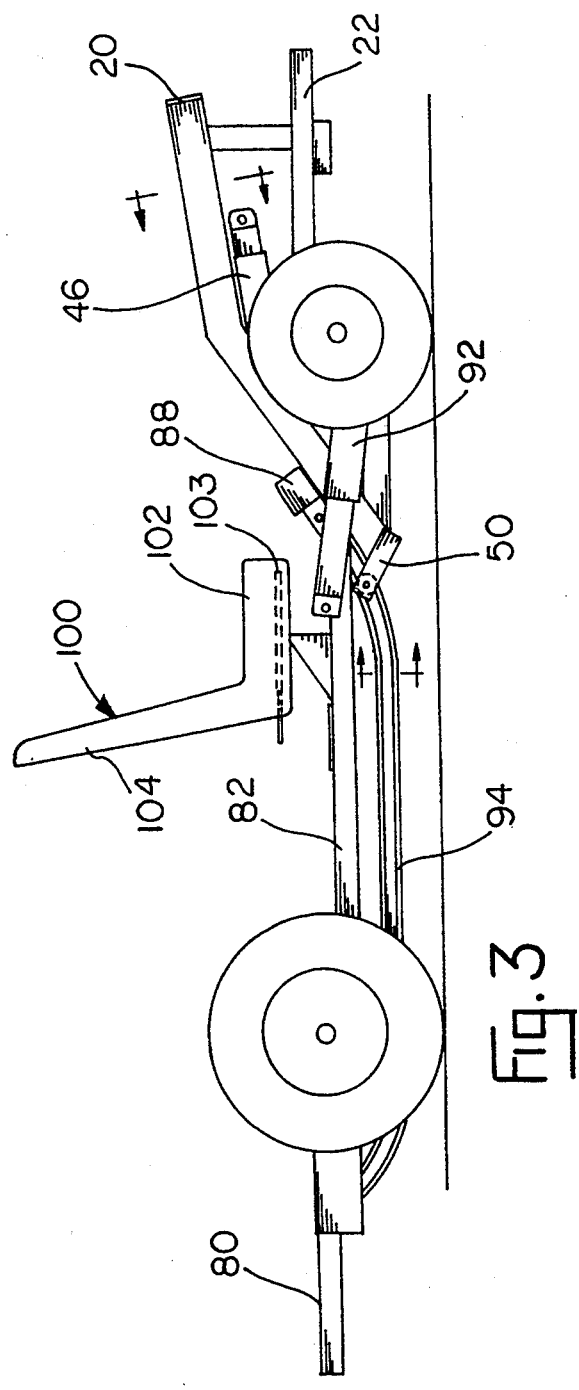

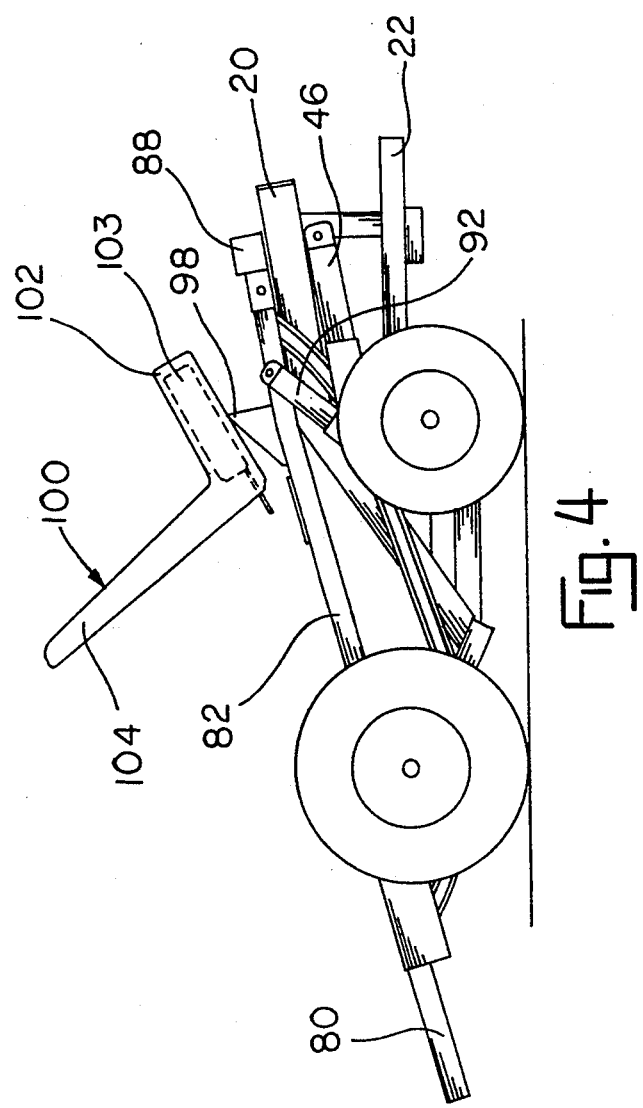

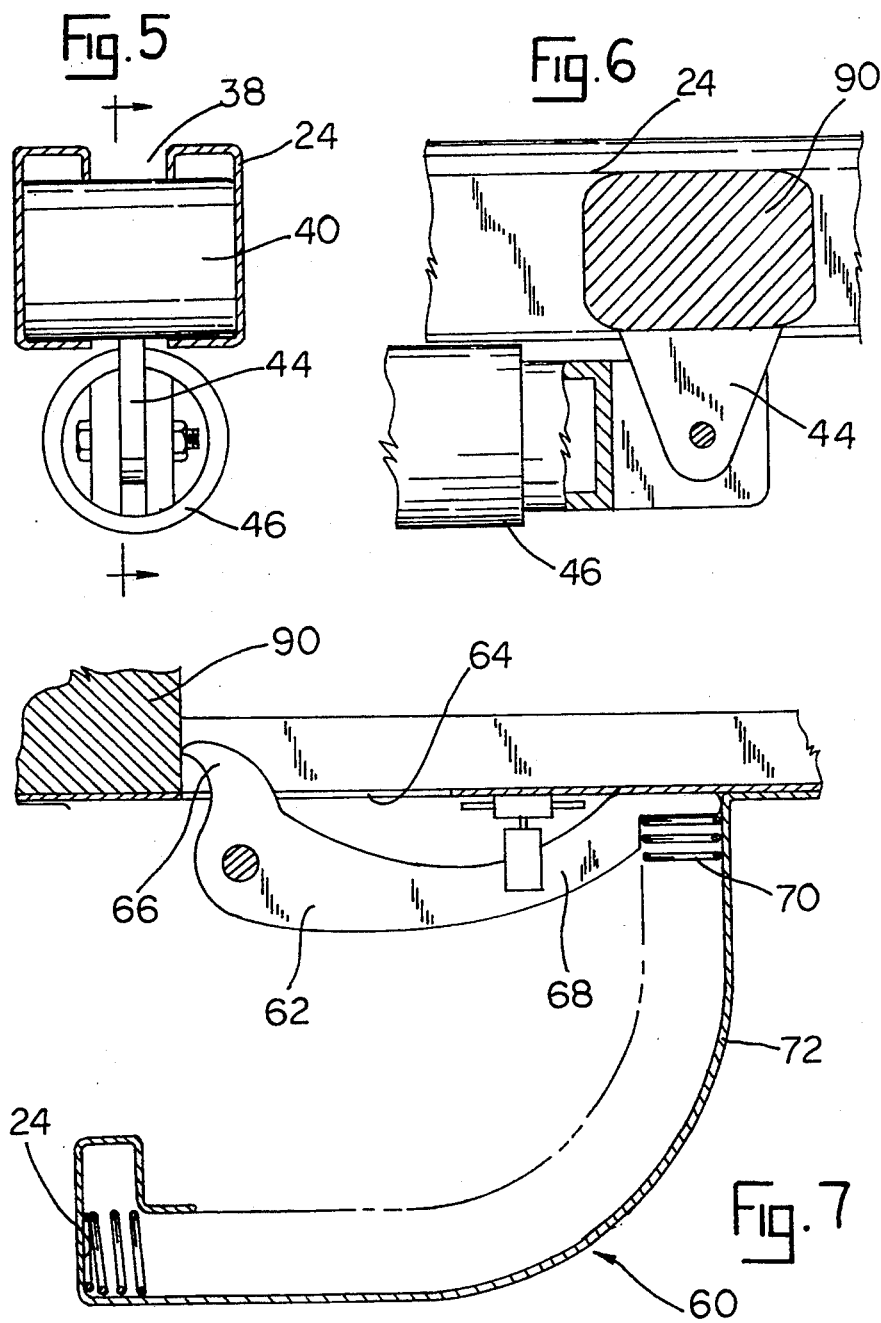

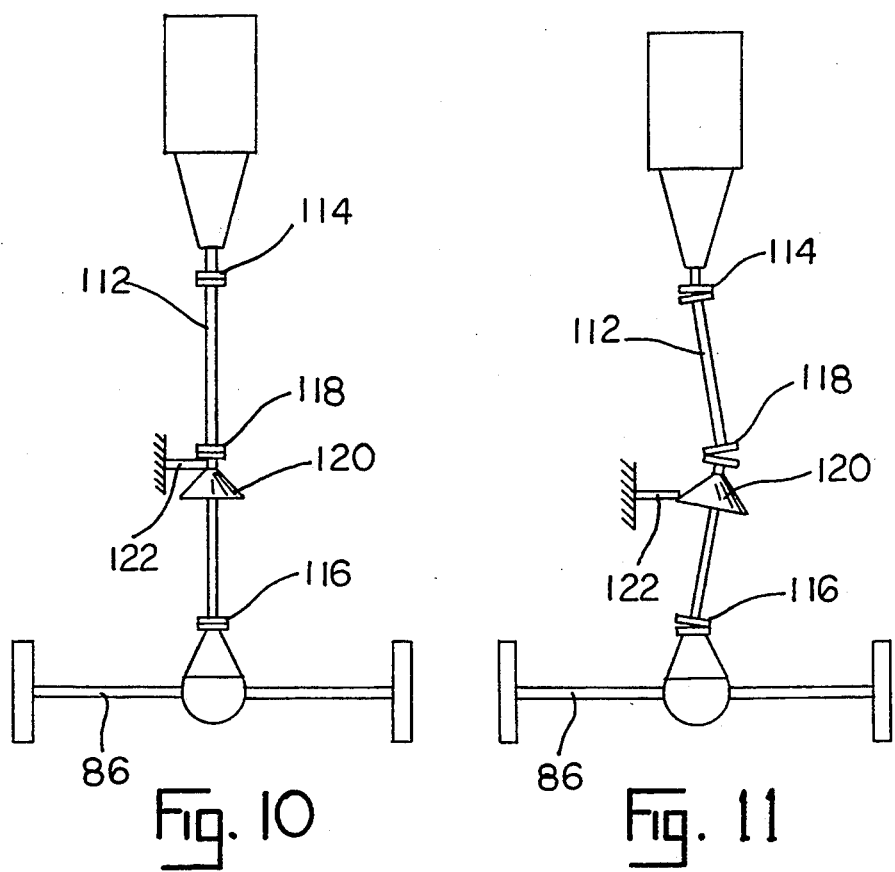

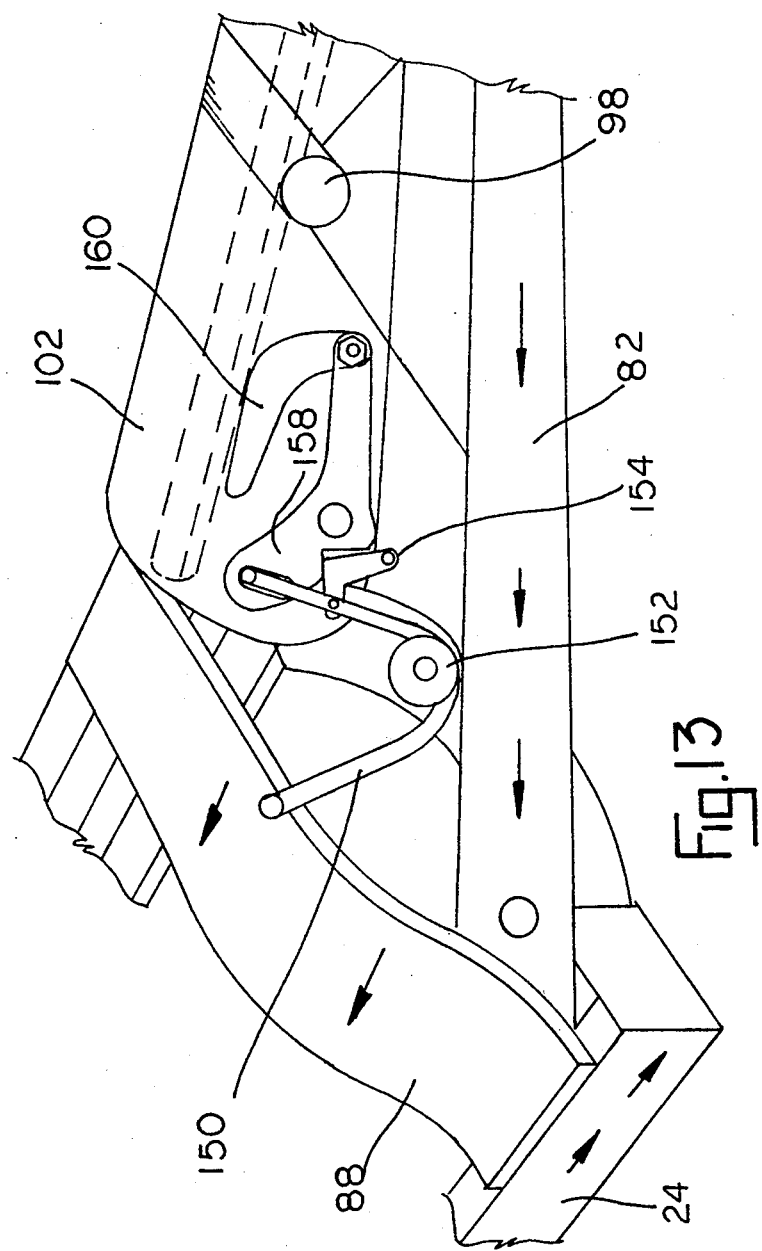

VEHICLE SAFETY SYSTEM

BACKGROUND AND SUMMARY OF THE INVENTION

The present invention is related to safety features for use with automotive vehicles. More particularly, the present invention is related to a slide-rail system which absorbs shock during automobile collisions.

Little if any introduction is necessary to explain the importance of safety features in automotive vehicles. Countless injuries and fatalities have been the result of automobile collisions and accidents. Building a safe vehicle should be a top priority for all automotive manufacturers, as well as the general public.

Over the years, several safety features have been developed which have reduced injuries to vehicle occupants. Safety features such as the seat belt and the air bag restraint system have been invaluable in terms of human safety. However, these safety features, while shielding the vehicle occupants from harm, do little to absorb or dissipate the potentially great forces which result from automobile accidents and collisions. A mechanism which absorbs and dissipates the collision forces would produce innumerable safety benefits, especially when used in conjunction with seat belts, air bags, and other known safety features.

Thus, it is an object of the present invention to provide a safety system which absorbs and dissipates the energy and force of an automobile collision.

Another object of the present invention is to provide an automotive safety mechanism which shields the vehicle passengers from harm.

These and other objects are attained in a safety system having a front frame with a pair of oppositely disposed, generally longitudinal receiving rails attached to the chassis of the vehicle, and a rear frame which is slidably receivable within the receiving rails. The rear frame includes a pair of spaced apart, longitudinally extending rods, including a cross member disposed therebetween. The cross member includes tabs depending therefrom, which are slidably receivable within the channels of the receiving rails. When a pre-determined force is applied to either the front frame or the rear frame, the rear frame slides relative to the receiving rails.

Attached to the receiving rail is an actuation mechanism. The actuation mechanism includes a swivel pin having a nub thereon, which is spring biased. The swivel pin is spring biased such that the nub extends at least partially into the channel of the receiving rail. As the tab on the cross member slides toward and contacts the nub, the nub is pushed out of the channel, against the force of the spring.

The present invention also includes a seat tilting mechanism. Typically, the vehicle includes a seat generally housed in a seating compartment. The seat is connected to a seat support, which is mounted to the rear frame. The seat is pivotable with respect to the seat support, and thus with respect to the seating compartment, the rear frame and the chassis, through an angle of approximately 30°. A cable is mounted to the chassis, and is connected to the cross member by a pulley. The cable is also connected to a lock mechanism mounted to the bottom of the seat. As the cross member slides forward with respect to the receiving rails, the cable exerts a tension onto the lock mechanism. The lock is then tripped, allowing the seat to pivot in a backward motion.

Typically, the vehicle seat includes a bottom cushion and a back cushion. Underneath the bottom cushion is an inflatable bag having an air inlet and air hose connected thereto. The actuation mechanism also trips the inflation of the bag.

The safety system includes a collapsible drive shaft mechanism. The typical automobile includes a generally longitudinally extending drive shaft, extending from the engine to the rear axle of the vehicle. The drive shaft includes a universal joint near the engine, one near the rear axle, and one intermediate the drive shaft. The safety system of the present invention includes a diversion flange and a diversion pin located adjacent the middle universal joint. When a compressive force is applied to the vehicle, and thus to the drive shaft, the diversion flange exerts a force on the diversion pin. The diversion pin pushes the universal joint in a direction transverse to the longitudinal axis of the drive shaft. The drive shaft thus pivots, and collapses.

The safety system also includes a hood deflector mechanism. A pair of energy reducing mechanisms, such as shock absorbers, are connected at one end to the chassis and at the other end to the hood of the vehicle. A cable is attached to the energy reducing mechanism near the hood, and is also connected to the hood release latch. The hood is pivotally mounted to the body near the front of the vehicle. When the vehicle encounters a front or rear end impact, a source of pressurized air is actuated, extending the energy reducing mechanism. This exerts a force on the cable, releasing the hood latch and allowing the hood to open. The open hood thus acts as a deflector shield, preventing objects from crashing through the vehicle windshield.

Other objects, advantages and novel features of the present invention will become apparent from the following detailed description of the invention when considered in conjunction with the accompanying drawings.

BRIEF DESCRIPTION OF THE DRAWINGS

FIG. 2 is a perspective view of the rear and front frames of the present invention, shown in a compacted position.

FIG. 3 is a side view of the front and rear frames and the seat of the present invention, shown in a fully extended position.

FIG. 4 is a side view of the front and rear frames and seat of the present invention, in a compacted position.

FIG. 5 is a cross-sectional view of a receiving rail of the present invention.

FIG. 6 is a side cross-sectional view of a receiving rail and energy reducing mechanism of the present invention.

FIG. 7 is a cross-sectional view of the actuation mechanism of the present invention.

FIG. 10 shows the collapsible drive shaft portion of the present invention in its normal, rest position.

FIG. 11 shows the collapsible drive shaft portion of the present invention as it begins to collapse.

FIG. 13 is a perspective view of the seat latch mechanism of the present invention.

DETAILED DESCRIPTION OF THE PREFERRED EMBODIMENTS

Figure 1:
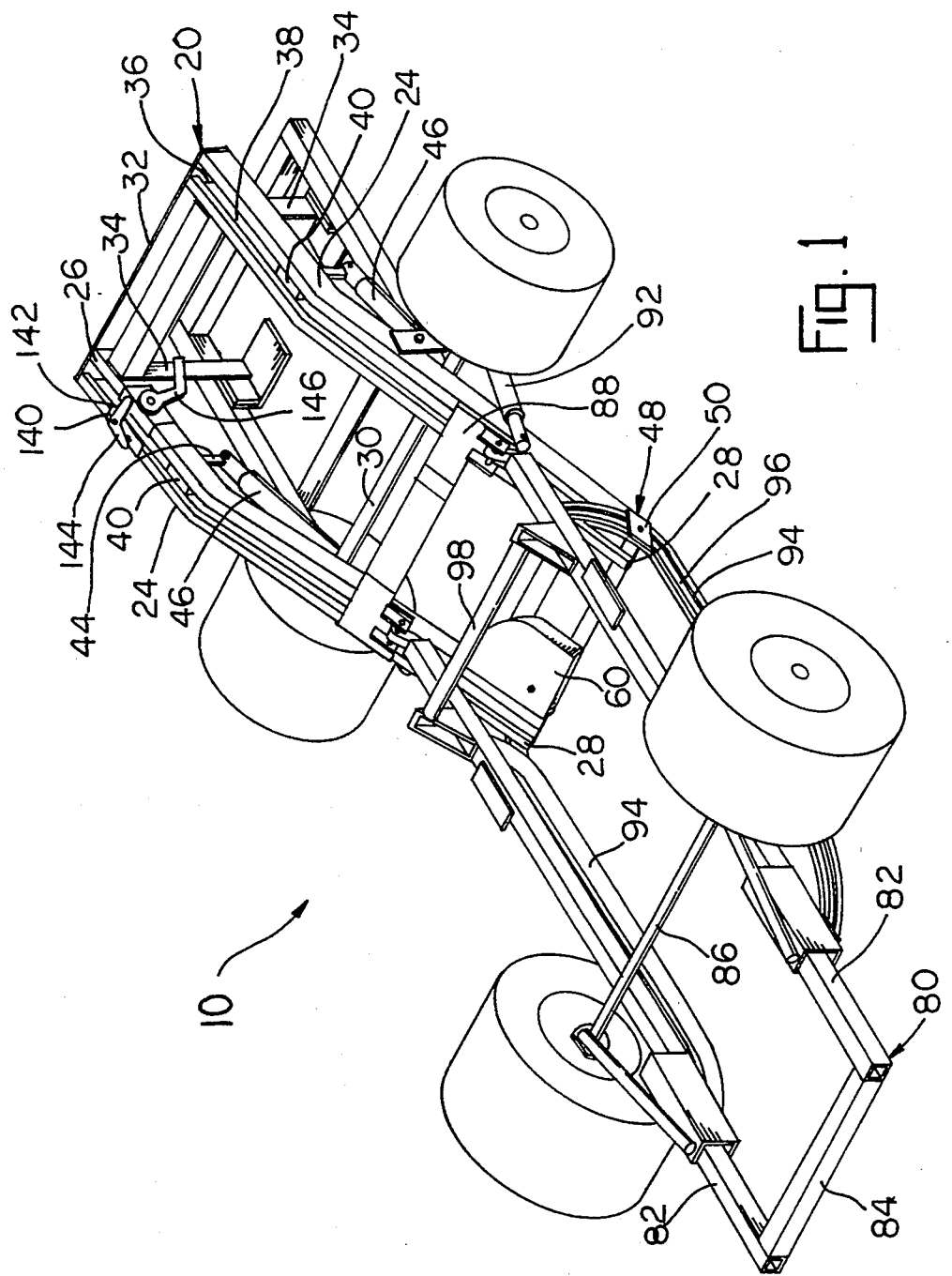
FIG. 1 shows a perspective view of the rear and front frame portions of the present invention, in a fully extended position.
Figure 8:
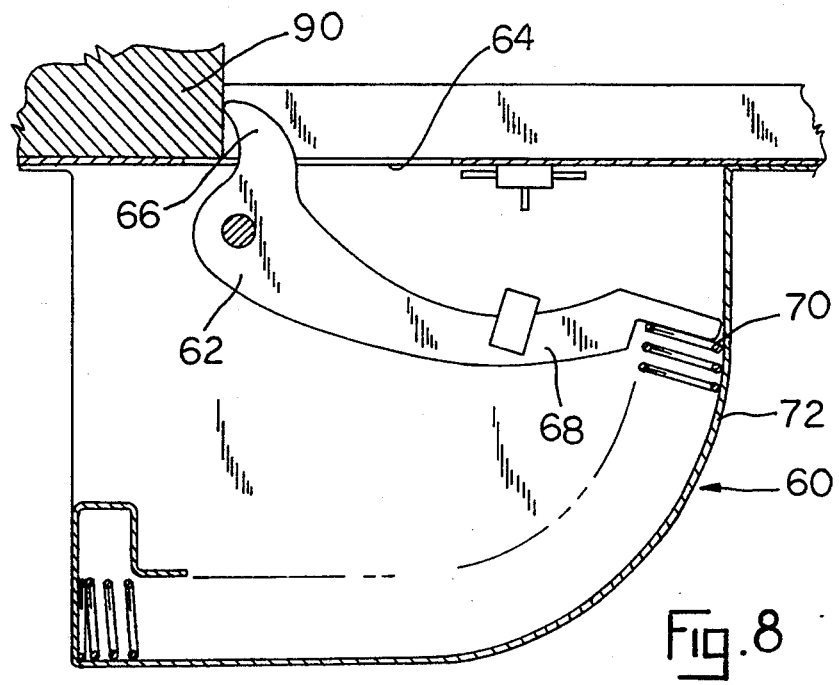
FIG. 8 is a cross-sectional view of the actuation mechanism of the present invention showing the swivel pin
Figure 9:
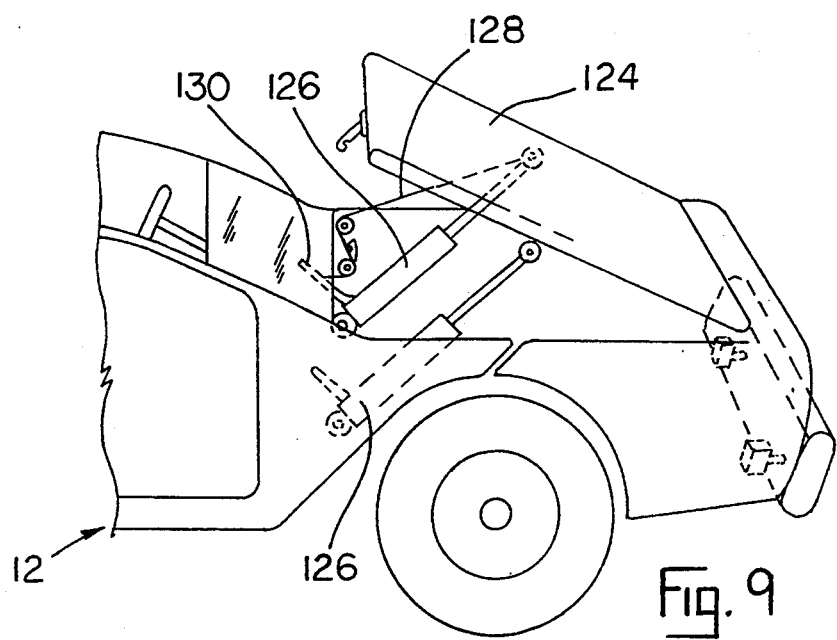
FIG. 9 shows the hood deflector portion of the present invention.

The present invention is for a safety feature for use in an automotive vehicle. The safety system of the present invention, referred to throughout by the reference numeral 10, can be used in a car, or other motorized vehicle, 12. Safety system 10 provides impact absorption and energy reducing features, to reduce the effects of a collision or other force exerted upon vehicle 12. Safety system 10 absorbs the energy from the collision force, thereby dissipating the potentially dangerous forces and preventing harm to the occupants of the vehicle.

Very generally, safety system 10 of the present invention includes front frame 20 and rear frame 80. This can be seen in FIGS. 1 and 2. Front frame 20 is attached to chassis 22 of vehicle 12, adjacent the front portion of the vehicle. Front frame 20 is made of a heavy-duty material such as a metal. Front frame 20 includes two opposing receiving rails 24 spaced apart from one another and extending substantially parallel to one another. In the illustrative embodiments shown, receiving rails 24 are spaced apart and are located at opposite sides of vehicle 12. Typically, the engine of the vehicle (not shown) is positioned substantially between opposing receiving rails 24. Receiving rails 24 include front end 26 and back end 28. From front end 26 of each receiving rail 24 is located most adjacent the front portion of vehicle 12. From front end 26, receiving rail 24 extends rearwardly toward the rear of the vehicle. Receiving rail 24 is also mounted to chassis 22 adjacent back end 28 of rail 24.

From front end 26, each receiving rail 24 extends substantially horizontally, or substantially parallel to the ground. Near front axle 30 of vehicle 12, receiving rail 24 angles downwardly at an angle of approximately 30° from the horizontal. Receiving rail 24 terminates at back end 28 near the longitudinal mid-section of vehicle 12.

Near front end 26 of receiving rail 24, front frame 20 includes cross bar 32 disposed between and substantially transverse to receiving rails 24. Cross bar 32 is attached to receiving rails 24 by welding or some similar manner. Front frame 20 also includes opposing posts 34 attached to each end of cross bar 32. Posts 34 extend generally transverse to and downward from cross bar 32. Posts 34 are welded to chassis 22 and aid in the connection of front frame 20 to the chassis.

Receiving rails 24 of front frame 20 include a longitudinally extending channel 36 therein. In the embodiments shown, channel 36 is generally rectangular in cross-section and includes opening 38 longitudinally along the top of receiving rail 24. Within each channel 36 is cam 40. Cam 40 is a generally rectangular block which is slidably disposed within channel 36. This can be seen in FIG. 5.

Opposite opening 38, each receiving rail 24 includes a slot therein (not shown) in the bottom side of the rail. Flange 44 is connected to cam 40 and projects downwardly through the slot. Flange 44 is connected at its opposite end to energy reducing mechanism 46. In the embodiments shown, energy reducing mechanism 46 may be an ordinary shock absorber. As shown, energy reducing mechanism 46 is connected at one end to flange 44 and at its opposite end to chassis 22. Thus, as cam 40 moves within channel 36, energy reducing mechanism 46 expands and contracts, thereby dissipating energy.

Front frame 20 also includes assembly 48 associated with each receiving rail 24. Assembly 48 includes flange 50 and cam 52. Adjacent back end 28 of each receiving rail 24, flange 50 extends generally transverse to receiving rail 24, and is connected to the rail. Connected to flange 50 is cam 52. Cam 52, in the embodiments shown, is a generally cube-shaped member. It is designed to be received within a portion of rear frame 80, and is slidably engageable therewith.

Attached to receiving rails 24 of front frame 20 is actuation mechanism 60. Actuation mechanism 60 includes swivel pin 62 which is disposed adjacent each receiving rail 24. Receiving rail 24 includes cut-out 64 therein, such that a portion of swivel pin 62 may enter channel 36 of receiving rail 24. Swivel pin 62 includes nub 66 which extends through cut-out 64 and into channel 36 and blocks a portion of the channel. Swivel pin 62 also includes finger 68, which extends generally transverse from nub 66. Swivel pin 62 is pivotably mounted to receiving rail 24 such that nub 66 may pivot in and out of cut-out 64. Pivoting nub 66 causes a corresponding pivoting movement of finger 68.

Actuation mechanism 60 also includes spring 70 and casing 72. Spring 70, as shown, is a typical coil spring. However, other spring elements may be substituted. The spring coefficient of spring 70 may also be chosen to suit a particular need. Casing 72 generally houses spring 70 and swivel pin 62. Casing 72 includes back stop 74. Spring 70 is connected to back stop 74, which provides a non-movable base for one end of the spring. The opposite end of spring 70 is positioned adjacent the distal end of finger 68. In its normal, rest position, spring 70 forces finger 68 against the side of receiving rail 24, and thus nub 66 extends through cut-out 64 and into channel 36. When a force greater than the tension of spring 70 is exerted on nub 66, it will cause swivel pin 62 to pivot.

Safety system 10 of the present invention also includes rear frame 80. Rear frame 80 is made of a heavy-duty metal, and includes opposing rods 82, spaced apart and located near opposite sides of vehicle 12. Rods 82 are connected by cross member 84 near the rear of the vehicle. Rods 82 are also mounted to rear axle 86 of vehicle 12. Rods 82 are spaced apart such that they are substantially aligned longitudinally with receiving rails 24 of front frame 20.

Figure 12:
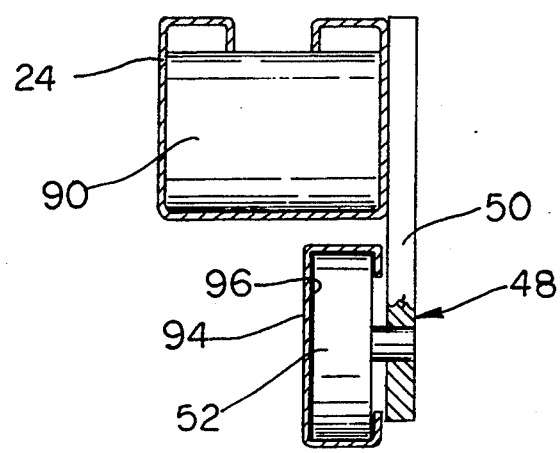
FIG. 12 is a cross-section view of the receiving rails of the front and rear frames.

Opposite cross member 84, rear frame 80 includes engaging bar 88. Engaging bar 88 is a generally rigid member made of metal. Engaging bar 88 is attached at opposite ends to rods 82 and disposed substantially transverse therebetween. Engaging bar 88 includes a pair of tabs 90 thereon, which extend generally downwardly from engaging bar 88. Tabs 90 are slidably receivable within channel 36 of receiving rail 24 and extend through opening 38 to be attached to engaging bar 88. Tabs 90 can be seen in FIG. 12.

Rear frame 80 also includes a pair of energy reducing mechanisms 92. One end of energy reducing mechanism 92 is connected to rod 82, and the opposite end of the energy reducing mechanism 92 is connected to chassis 22.

Attached to and adjacent each rod 82, rear frame 80 includes receiving rail 94 extending generally parallel to the rod. In the embodiments shown, receiving rail 94 is disposed below and outside of each rod 82 and is connected at opposite ends to the rod. Receiving rail 94 is a generally C-shaped member and is shaped like receiving rail 24. Receiving rail 94 includes groove 96 therein. Cam 52 is receivable within groove 96 of receiving rail 94. In certain embodiments, cam 52 may be spring-mounted (not shown) within groove 96, such that it provides additional resistance to the translation of front frame 20 with respect to rear frame 80.

Rearward of engaging bar 88, rear frame 80 includes seat support 98. Seat support 98 is a rigid member, disposed transverse to receiving rail 24. In the embodiments shown, seat support 98 is generally cylindrical in shape. A seat support 98 is disposed substantially below each seat 100 of vehicle 12. Seat 100 supports the passenger riding in vehicle 12 and typically comprises bottom cushion 102 and a back cushion 104. Seat 100 is attached to seat support 98 adjacent bottom cushion 102, allowing seat 100 to pivot with respect to seat support 98. Seat 100 is also pivotable with respect to the entire passenger compartment of vehicle 12.

The present invention includes a locking mechanism (not shown) and stop mechanism which limit the pivoting action of seat 100. The temporary locking mechanism retains seat 100 in its normal, generally upright position for normal use. However, when vehicle 12 is in a collision, the temporary locking mechanism is released and seat 100 is free to pivot about seat support 98. In the embodiments shown, seat 100 is free to tilt rearwardly, through an angle of approximately 30°. After tilting through this angle, back cushion 104 contacts a mechanical stop (not shown) preventing further pivoting action of the seat. When vehicle 12 includes a back seat, a similar mechanism may be used to allow the back seat to tilt rearwardly, also through an angle of approximately 30 degrees.

The present invention also includes a seat latch mechanism for aiding in the pivoting action of seat 100. A cable 150 is secured to chassis 22, near engaging bar 88. Cable 150 is wound about engaging bar 88 and is disposed about a pulley 152 located on engaging bar 88. The cable is also connected, opposite its connection to chassis 22, to the latching mechanism. The seat latch mechanism includes switch 154 and lever 158. Lever 158 which is slidably received within slot 160 on seat 100. The seat latch mechanism configuration can be seen in FIG. 13. Cable 150 is connected to both switch 154 and lever 158. When a force is exerted upon cable 150, switch 154 is tripped, releasing lever 158. The force on cable 150 pulls on lever 158, thus allowing the lever to slide within slot 160. Seat 100 is thus released from its locked position relative to chassis 22, and is allowed to tilt rearwardly until lever 158 contacts the end of slot 160 and locks into place.

When a force is exerted onto cable 150, the force is transmitted to the latching mechanism. When the force is of a predetermined amount, seat support 98 is released from its locked, upright position. This allows seat 100 to pivot rearwardly about seat support 98. The thrust of the passenger against back cushion 104 causes seat 100 to pivot. Rear frame 80 translates with respect to front frame 20 and chassis 22, and thus the cable exerts a pulling force onto seat 100. This pulling force also aids in the tilting motion of the seat. After seat 100 rotates through an angle of approximately 30°, back cushion 104 contacts the mechanical stop. As rear frame 80 continues to move relative to chassis 22, the strength of the cable will be overcome, and it will snap.

Below bottom cushion 102 is bag 103. Bag 103 is preferably made of a durable, inflatable material, such as a heavy duty plastic. Bag 103 may be inflated, from a source of pressurized air. Bag 103 includes air inlet 110 which can be connected to a source of pressurized air. When actuated, the pressurized air fills bag 103, thus expanding the bag and providing a safety buffer for passengers in seat 100. In certain embodiments, bag 103 may be divided into separate sections (not shown). For example, in a bench seat arrangement designed for accommodating more than one person, bag 103 may be sub-divided into smaller compartments, one compartment for each passenger.

Vehicle 12 utilizing the present invention typically includes a body. The body is a two-piece member, including a front piece and a back piece. The front piece of the body is fixedly attached to chassis 22, and the back piece is fixedly attached to rear frame 80. The mating area of the front piece and the back piece is designed to allow the back piece to translate with respect to the front piece.

Safety system 10 of the present invention also includes a collapsible drive shaft mechanism. This can be seen in Figures 10 and 11. Typically, vehicle 12 includes drive shaft 112 extending from the engine to rear axle 86. Drive shaft 112 includes first universal joint 114 near the engine, second universal joint 116 adjacent rear axle 86, and third universal joint 118 intermediate the drive shaft. Safety system 10 includes a diversion flange 120 mounted to drive shaft 112, near third universal joint 118. Diversion flange 120 is a generally cone-shaped member. Between diversion flange 120 and third universal joint 118, is diversion pin 122. Diversion pin 122 is a small tab, connected to diversion flange 120, near third universal joint 118. Diversion pin 122 is preferably located so as to push drive shaft 112 towards the passenger side of vehicle 12, away from the driver's side. Drive shaft 112 pivots about each of the universal joints and thus collapses, allowing front frame 20 and rear frame 80 to translate together.

The present invention also includes a hood deflector system. When utilizing the present invention, hood 124 of vehicle 12 is hinged near the front of the vehicle. A pair of opposing energy reducing mechanisms 126 are connected at one end to chassis 22 and at the other end to hood 124. Cable 128 is connected to energy reducing mechanism 126, and to hood latch mechanism 130. Upon impact to vehicle 12, a source of pressurized air is actuated which activates energy reducing mechanism 126. Energy reducing mechanism 126 extends, thus creating a tension in cable 128. The tension in cable 128 releases hood latch mechanism 130, and allows hood 124 to open. As the hood opens, it acts as a deflector shield, deflecting debris from entering the passenger compartment through the windshield.

Another feature of the present invention is strap carrier 140. Strap carrier 140 is a generally rectangular member having three sides. Strap carrier 140 can be positioned in a snap-fit arrangement about receiving rail 24. As shown in FIG. 1, strap carrier 140 is positioned adjacent front end 26 of receiving rail 24. Strap carrier 140 includes slot 142 therein, which may be aligned with opening 38 in receiving rail 24. Lock bar 144 extends across slot 142 and is connected to strap 146. Opposite lock bar 144, strap 146 is connected to chassis 22. As vehicle 12 compacts upon impact, and rear frame 80 translates with respect to front frame 20, engaging bar 88 and tabs 90 contact bar 144. The force of the impact allows engaging bar 88 to snap lock bar 144, thereby disengaging the strap carrier from the vehicle.

As described, safety system 10 of the present invention operates in the following manner. A vehicle which is struck by a significant force can cause trauma and injury to the vehicle occupants. To avoid injury, safety system 10 of the present invention absorbs the potentially damaging energy of such a force and dissipates the energy safely. Typically, when a force is exerted upon a vehicle, the energy is dissipated in the deformation of the vehicle chassis and body. The passenger compartment of the vehicle may also be deformed, which can cause injury to the passengers.

When vehicle 12 equipped with safety system 10 encounters a force, front frame 20 and rear frame 80 are pushed together. The rear frame draws the rear axle towards the front axle, so that the distance between front axle 30 and rear axle 86 decreases. The weight of front frame 20 and rear frame 80 provide resistant to translation between the two components, and a predetermined minimum level of force is needed to activate safety system 10. A temporary locking mechanism (not shown) may also be used. Such a mechanism would be connected to front frame 20 and rear frame 80. In such instances, the temporary locking mechanism would give way to a predetermined force, and would combine with the weight of the front and rear frames to comprise the minimal inertia level necessary to be overcome to activate safety system 10.

When a force is applied to vehicle 12 which is greater than the minimal inertia level of the system, front frame 20 and rear frame 80 will translate with respect to one another. Opposing rods 82 on rear frame 80 push engaging bar 88 towards the front of the vehicle. Tabs 90 on engaging bar 88 are received within channel 36. From its rest position, engaging bar 88 transitions first through an incline, and then in a generally horizontal direction. Energy reducing mechanism 92, connected to rod 82 and chassis 22, provides resistance to this translation, and thus absorbs energy from the force.

As front frame 20 and rear frame 80 translate toward one another, tabs 90 on engaging bar 88 contact nub 66. Continued translation of rear frame 80 and front frame 20 with respect to one another causes tab 90 to push against nub 66, and to pivot swivel pin 62 out of channel 36. This pivoting action is against the force of spring 70. The pivoting action of swivel pin 62 actuates the source of pressurized air, thus inflating bag 103 underneath seat 100. Thus, the bag is inflated with air.

As rear frame 80 translates toward the front of vehicle 12, a tension is created within the cable. The tension in the cable releases seat locking pin 108, allowing seat 100 to pivot rearwardly. The cable continues to pull forward on the bottom portion of seat 100, thus assisting in the rearward pivoting action of the vehicle seat. Seat 100 tilts, protecting the passenger from harm. Furthermore, as bag 103 is inflated with air, the bottom cushion acts as an additional barrier between frontal impact and the passenger.

Also upon impact, diversion flange 120 is compressed against diversion pin 122. Diversion pin 122 thus exerts a force onto drive shaft 112 which is substantially transverse to the longitudinal axis of the drive shaft. This force is preferably directed toward the passenger side of the vehicle. This force causes drive shaft 112 to pivot about first universal joint 114 and second universal joint 116. Thus, drive shaft 112 collapses and does not hinder the translation of front frame 20 and rear frame 80.

Also upon impact, the source of pressurized air actuates energy reducing mechanism 126. This creates a tension in cable 128, which releases hood latch mechanism 130. Hood 124 thus pivots upwardly, and acts as an additional barrier between objects and the vehicle windshield.

As engaging bar 88 translates with respect to channel 36, tabs 90 contact cam 40 located within channel 36. As tabs 90 push against cam 40, energy reducing mechanism 46 is expanded, thus absorbing energy from the force. As engaging bar 88 translates with respect to front frame 20, cam 52 slides within groove 96. This provides additional stability of front frame 20, with respect to rear frame 80, and provides four-point translational contact between front frame 20 and rear frame 80.

As can be seen in FIGS. 2 and 4, the overall length of safety system 10 and vehicle 12 contracts as rear frame 80 translates with respect to front frame 20. Rear frame 80 draws rear axle 86 towards front axle 30. The energy from the invasive force is thus absorbed by safety system 10 and is dissipated before it causes damage to vehicle 12 or its occupants.

Although the present invention has been described in detail, the scope of the present invention is to be limited only by the terms of the appended claims.

What is claimed is:

1. A safety system for use in a vehicle, said vehicle having a chassis, a seating compartment having a seat therein, a front axle and a rear axle, said safety system comprising:

front and rear frames;

one of said frames having at least one receiving rail attached to said chassis, said chassis supporting one of said axles, said rail extending over said one axle toward a corresponding end of the vehicle;

the other frame being attached to the other axle, said other frame slidably engaging said receiving rail, for sliding movement along said receiving rail over said one axle in response to a force applied to at least one of said frames, such that said rear axle and said front axle are drawn together.

2. The safety system according to claim 1, wherein said safety system includes two, spaced apart receiving rails.

3. The safety system according to claim 2, wherein said rear frame includes two opposing rods having a cross member disposed there-between, said cross member including at least one tab thereon which is slidably receivable within said receiving rail.

4. The safety system according to claim 1, further including a hood deflector mechanism, said hood deflector mechanism including a pair of opposing energy reducing mechanisms connected to said chassis and said hood, and a cable connected to said energy reducing mechanism and a hood latch mechanism, such that expansion of said energy reducing mechanisms causes a tension in said cable, thus releasing said hood latch mechanism.

5. The safety system according to claim 1, further including a seat tilting mechanism for allowing said seat to tilt with respect to said seating compartment, said chassis and said rear frame.

6. The safety system according to claim 5, including a seat support connected to said rear frame, such that said seat is pivotally mounted to said seat support.

7. The safety system according to claim 6, wherein said seat includes a bottom cushion, a back cushion and a bag, said bag being substantially inflatable.

8. The safety system according to claim 1, including at least one actuation mechanism connected to said receiving rail.

9. A safety system for use in a vehicle, said vehicle having a chassis, a seating compartment having a seat therein, a front axle and a rear axle, said safety system comprising:
   a front frame having at least one receiving rail attached to said chassis; and
   a rear frame attached to said rear axle for slidably engaging said receiving rail wherein said rear frame slides with respect to said receiving rail in response to a force applied to at least one of said receiving rail and said rear frame, such that said rear frame draws said rear axle towards said front axle, and at least one actuation mechanism connected to said receiving rail, said actuation mechanism including a pin extending partially into said receiving rail, said pin being pivotally mounted to said receiving rail, and being spring biased into said receiving rail.

10. A safety system for use in a vehicle, said vehicle including a chassis, a seating compartment having a seat therein, a front axle and a rear axle, and a hood with a latch mechanism, said safety system comprising:
    at least one receiving rail attached to said chassis;
    a rear frame attached to said rear axle for slidably engaging said receiving rail; and
    an actuation mechanism connected to said receiving rail for actuating the slidable engagement of said rear frame with said receiving rail, said actuation mechanism including a pin pivotally mounted to said receiving rail and extending at least partially into said receiving rail;
    said rear frame sliding with respect to said receiving rail in response to a force applied to at least one of said receiving rail and said rear frame such that said rear axle is drawn toward said front axle;
    said rear frame including two opposing rods having a cross member disposed there-between, said cross member including at least one tab thereon which is slidably receivable within said receiving rail;
    a seat tilting mechanism for allowing said seat to tilt with respect to said seating compartment, said chassis and said rear frame, and
    a collapsible drive shaft, said drive shaft including a universal joint positioned intermediate thereon, said drive shaft including a diversion flange to said drive shaft adjacent said universal joint, and a diversion pin connected to said diversion flange adjacent said universal joint.

11. A safety system for use in a vehicle, said vehicle having a chassis, a seating compartment having a seat therein, a front axle and a rear axle, said safety system comprising:
    front and rear frames;
    one of said front and rear frames having at least one receiving rail attached to said chassis, said chassis supporting one of said axles, said rail extending over said one axle toward a corresponding end of the vehicle;
    the other frame being attached to the other axle, said other frame slidably engaging said receiving rail for sliding movement along said receiving rail over said one axle in response to a force applied to at least one of said frames such that said rear frame draws said rear axle towards said front axle; and
    energy absorbing means connected between said other frame and said chassis for absorbing energy as said other frame slides along said rail.

* * * * *